UNITED STATES PATENT OFFICE.

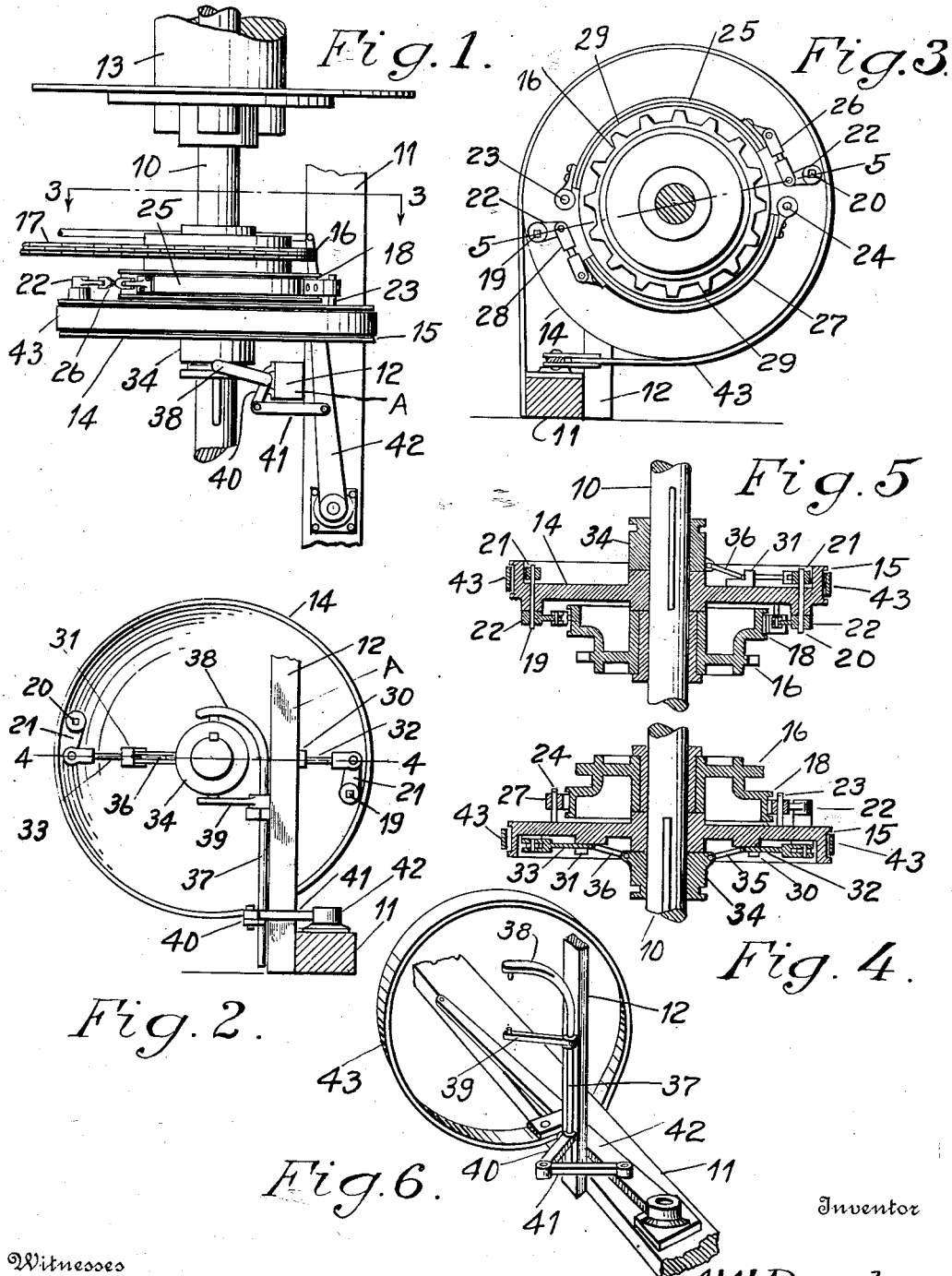

ARTHUR W. PURCHAS, OF OILFIELDS, CALIFORNIA.

CLUTCH AND BRAKE CONTROL FOR SHAFTS.

1,114,286.  Specification of Letters Patent.  Patented Oct. 20, 1914.

Application filed January 24, 1913. Serial No. 744,049.

*To all whom it may concern:*

Be it known that I, ARTHUR W. PURCHAS, a subject of the King of Great Britain, residing at Oilfields, in the county of Fresno, State of California, have invented certain new and useful Improvements in Clutch and Brake Control for Shafts; and I do hereby declare the following to be a full, clear, and exact description of the invention, such as will enable others skilled in the art to which it appertains to make and use the same.

This invention relates to clutch and brake controls for shafts and particularly to a clutch and brake control adapted for association with the sand reel shaft of a well driving rig although the device is in no way restricted to use in connection with a sand reel shaft.

The object of the invention resides in the provision of a device of the character named through the instrumentality of which a rotatable shaft may be readily connected to and disconnected from a suitable driving element, the operation of the device to disconnect the shaft from the driving element serving at the same time to operate a brake mechanism for locking said shaft against rotation, while the operation of the device to connect the shaft with a driving element serves to simultaneously release said brake mechanism.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a fragment of a sand reel shaft of a well drilling rig showing the invention applied. Fig. 2 an end view of what is shown in Fig. 1. Fig. 3 a section on the line 3—3 of Fig. 1. Fig. 4 a section on the line 4—4 of Fig. 2. Fig. 5 a section on the line 5—5 of Fig. 3, and Fig. 6 a detail perspective view of the operating lever and adjacent parts.

Referring to the drawings 10 indicates the sand reel shaft of a well drilling rig said shaft being suitably journaled upon a frame or base A although the journal bearings of said shaft are not shown in this instance as they are not essential to a complete understanding of the invention. The frame A includes in its structure a cross beam 11 and a jack post 12. Fixed upon the shaft 10 is a sand reel 13 of the usual and well known construction. Also fixed upon the shaft 10 is a wheel 14 which may be either of the spoke or disk type and is shown in this instance as the latter. The wheel 14 is provided at its outer edge with a laterally directed flange 15 for a purpose that will presently appear. Loosely mounted upon the shaft 10 between the sand reel 13 and the wheel 14 is a sprocket wheel 16 which is adapted to be connected by a sprocket chain 17 with a suitable driving element (not shown). The sprocket wheel 16 has formed on the side thereof adjacent the wheel 14 a drum 18. Rotatably mounted in the disk of the wheel 14 at diametrically opposite points are shafts 19 and 20 and fixed on the end of each of these shafts are crank arms 21 and 22 respectively, the crank arms of each shaft being disposed on opposite sides of the disk of the wheel 14 as will be obvious. Extending transversely through the disk of the wheel 14 at diametrically opposite points are crank pins 23 and 24. Anchored to the crank pin 23 is one end of a friction band 25 the other end of said band being connected to the free end of the crank arm 22 of the shaft 20 by an adjustable connection 26. Secured to the crank pin 24 is one end of a friction band 27, the other end of said band being pivotally connected to the free end of the crank arm 22 of the shaft 19 by means of an adjustable connection 28. These bands 25 and 27 extend contiguous with the periphery of the drum 18 and are each provided with friction spacings 29 disposed next to said drum 18.

Formed on the sides of the disk of the wheel 14 which is remote from the sprocket wheel 16 and on opposite sides of the shaft 10 are eye members 30 and 31. Slidable in the eye member 30 is a rod 32 which has its outer end pivotally connected to the crank arm 21 of the shaft 19. Also slidably mounted in the eye member 31 is a rod the outer end of which is pivotally connected to the crank arm 21 of the shaft 20. Slidably and non-rotatably mounted on the shaft 10 is a sleeve 34 to which is pivotally connected one end of a link 35 the other end of said link being pivotally connected to the inner end of the rod 32. Another link 36 has one end pivotally connected to the sleeve 34 at a point diametrically opposite to the connection of said sleeve with the link 35, while the other end of said link 36 is pivotally connected to the inner ends of the rod 33.

Rotatably mounted upon the jack post 12 is a vertical shaft 37 which is provided at its upper end with spaced arms 38 and 39 embracing the sleeve 34 and pivotally connected to the latter at diametrically opposite points. The shaft 37 is also provided adjacent its lower end with an arm 40 and pivotally connected to the free end of this arm is one end of a link 41. Pivotally mounted upon the cross beam 11 for movement in a horizontal plane is an operating lever 42 and pivotally connected to this lever is the other end of the link 41. A brake band 43 has one end anchored to the cross beam 11 and is then carried around the flange 15 and has its other end pivotally connected to the lever 42 between the link 41 and the free end of said lever.

Assuming that the sprocket wheel 16 and drum 18 are being rotated by a suitable driving element it will be apparent that when the free end of the lever 42 is moved toward the shaft 10 the shaft 37 will be rotated so as to slide the sleeve 34 toward the wheel 14. This movement of the sleeve 34 will through the medium of the various connections heretofore described rotate the shafts 19 and 20 to draw the friction bands 25 and 27 tightly against the periphery of the drum 18 so that wheel 14 and shaft 10 will partake of the rotation of the drum 18. During the movement of the lever 42 just referred to it will also be apparent that the brake band 43 will be released from frictional engagement with the flange 15. When the lever 42 is moved away from the shaft 10 the sleeve 34 will be drawn away from the wheel 14 which will result in the shafts 19 and 20 being rotated in the opposite direction and the friction bands 25 and 27 removed from operative engagement with the periphery of the drum 18. This last named movement of the lever 42 will also operatively apply the brake band 43 to the flange 15 and thus lock the shaft 10 against rotation under the influence of a weight suspended from the cable being wound upon the reel 13.

What I claim is:—

The combination with a driven shaft, of a drum loosely mounted thereon, a second drum fixed on said shaft, a rocker shaft journaled on the second drum, a friction band extending contiguous with the periphery of the first named drum and having one end anchored to the second named drum, a crank arm on said rocker shaft, connections between the other end of said friction band and said crank arm, a second arm on said rocker shaft disposed on the opposite side of the second named drum from the first named crank arm, a collar slidable on the driven shaft, connections between the collar and the second named crank arm whereby the sliding of the collar will rotate said rocker shaft to move the friction band into and out of engagement with the periphery of the first named drum, an operating lever, connections between said lever and the collar whereby the oscillation of the former will slide the latter, a fixed element, a brake band extending contiguous with the periphery of the second named drum and having one end anchored to a fixed element and its other end connected to said lever for movement by the latter into and out of engagement with the second named drum simultaneously with and reversely to the movement of the friction band into and out of engagement with the periphery of the first named drum.

In testimony whereof, I affix my signature, in the presence of two witnesses.

ARTHUR W. PURCHAS.

Witnesses:
RICHARD McCORMAC,
H. P. JAYNE.